United States Patent [19]

Shimajiri et al.

[11] Patent Number: 4,989,775
[45] Date of Patent: Feb. 5, 1991

[54] METHOD FOR BRAZING ALUMINUM COMPONENTS

[75] Inventors: Yoshifumi Shimajiri, Utunomiyashi; Masakazu Furuta; Akio Tani, both of Oyamashi, all of Japan

[73] Assignee: Showa Aluminum Kabushiki Kaisha, Osaka, Japan

[21] Appl. No.: 285,054

[22] Filed: Dec. 14, 1988

[30] Foreign Application Priority Data

Dec. 15, 1987 [JP] Japan ............................. 62-317100
Jan. 27, 1988 [JP] Japan ............................. 63-16696

[51] Int. Cl.$^5$ .................................................. B23K 31/06
[52] U.S. Cl. ........................................ 228/218; 228/183
[58] Field of Search ............... 228/207, 218, 217, 220, 228/223, 263.17, 219, 220

[56] References Cited

U.S. PATENT DOCUMENTS

| 4,098,450 | 7/1978 | Keller et al. | 228/220 |
| 4,119,262 | 10/1978 | Yen et al. | 228/220 |
| 4,645,119 | 2/1987 | Haramaki et al. | 228/263.17 |
| 4,705,206 | 11/1987 | Kamiya et al. | 228/263.17 |
| 4,732,311 | 3/1988 | Hasegawa et al. | 228/263.17 |
| 4,739,920 | 4/1988 | Kujas | 228/207 |
| 4,842,185 | 6/1989 | Kudo et al. | 228/219 |

Primary Examiner—M. Jordan

[57] ABSTRACT

A method for brazing aluminum components with a flux, wherein the flux and the aluminum components are heated together in a brazing furnace filled with a nonoxidizing gaseous medium, thereby fluxing and brazing the aluminum components at one time, or wherein the flux is previously pulverized and electrostatically deposited on the aluminum components, and the fluxed aluminum components is heated to a brazeable temperature in the furnace, thereby melting the braze metal and effecting the braze joints between the aluminum components.

15 Claims, 1 Drawing Sheet

METHOD FOR BRAZING ALUMINUM COMPONENTS

BACKGROUND AND SUMMARY OF THE INVENTION

The present invention relates to a method for brazing aluminum components, and more particularly to a method for brazing aluminum components with the efficient use of a flux. In this specification aluminum includes aluminum alloys.

When aluminum components are assembled into a heat exchanger, they are fluxed prior to brazing, except for the vacuum brazing. The heat exchangers include radiators, evaporators, and condensers for car coolers.

Under the common practice a flux is suspended in a water or a solvent, and coated on the surfaces of aluminum components by spraying, by showering or by dipping. After the fluxed surfaces are dried by preheating, the aluminum components are heated to a brazeable temperature in a nonoxidizing atmosphere at which a braze metal melts to effect the braze joints. This method requires at least two preparatory steps: one is to prepare a flux suspension and the other is to coat it on the surfaces of the aluminum components and dry the fluxed surfaces. Thus the preparation takes a longer time, and consumes labor. In addition, a problem is that during drying the aluminum and the water contained in the flux suspension react with each other to form an oxide film, which reduces the brazeability of the braze metal. Another problem is the waste of flux: more specifically, to obtain the flux suspension, a considerable quantity of flux must be added but most of it is left unused and thrown away. There is a further problem resulting from over-fluxing on the components. The leftovers of flux on the surfaces remain as stains. A still further problem arises when the flux is coated on the components which are provisionally assembled with fastening jigs. When the provisional assembly is preheated to dry the fluxed surfaces, the fastening jigs and the components are likely to adhere to each other. In addition, when the jigs are subjected to frequent preheating, the heat fatigues them. When the components include pipes, they must be covered so as not to allow the flux suspension to enter. An extra masking process is required. This also consumes labor, and unfavorably prolongs the time spent in brazing.

The present invention is directed toward an improved method for brazing aluminum components which solves the problems pointed out with respect to the known brazing method. Thus an object of the present invention is to provide a method for brazing aluminum components by a simplified procedure.

According to one aspect of the present invention, there is a method for brazing aluminum components which comprises setting a flux and aluminum components in a furnace filled with a nonoxidizing gaseous medium; thereby suspending the flux in the nonoxidizing gaseous medium; heating the aluminum components to a brazeable temperature; and allowing a braze metal to melt so as to effect the braze joints between the aluminum components.

According to another aspect of the present invention, there is a method of brazing aluminum components, the method comprising filling a brazing furnace with a nonoxidizing gaseous medium; setting a flux in the furnace, thereby allowing the flux to suspend in the nonoxidizing gaseous medium; placing electro-statically fluxed aluminum components in the furnace; and heating the aluminum components to a brazeable temperature, thereby allowing a braze metal to melt and effect the braze joints between the aluminum components.

Other objects and advantages of the present invention will become more apparent from the following detailed description, when taken in conjunction with the accompanying drawings which show, for the purpose of illustration only, one embodiment in accordance with the present invention.

DETAILED DESCRIPTION OF THE PREFERRED EMBODIMENTS

The flux used in the present invention can be any kind, and have any composition, provided that it is effective for brazing. A fluoride-base flux is advantageous in that it leaves no corrosive leftovers. For example, potassium fluoride (KF) and aluminum fluoride ($AlF_3$) can be complexed so as to be eutectic or approximately eutectic. Alternatively, $KAlF_4$ and KF can be mixed at the ratio of 80~99.8 to 20~0.2. A further example is a flux which is obtained by dissolving $\gamma$-$AlF_3$ powder and/or $\beta$-$AlF_3$ in a KF solution to allow an exothermic reaction to occur, thereby obtaining a dehydrated residue usable as a flux.

The present invention has eliminated the necessity of the intermediate processes of obtaining a flux suspension, coating it on the aluminum components, and drying the fluxed surfaces. According to the present invention the fluxing takes place when the flux is suspended in a nonoxidizing gaseous medium in the brazing furnace; hereinafter, this will be referred to as the flux suspending method. Alternatively, the flux is pulverized and electrostatically deposited on the aluminum components, which are then brazed in the brazing furnace; hereinafter, this will be referred to as the electrostatic flux depositing method. First, the flux suspending method will be described:

In the present invention a solid flux is used, wherein the "solid" means a lump, powder and amorphous state; in a word, it is non-liquid. Preferably, however, the flux is pulverized to be 2.0 to 80 $\mu$m in diameter, so as to be well floatable in a furnace.

When the flux is in a powdery form, a receptacle is employed. The receptacle is preferably flat and shallow like a tray so as to allow the flux to quickly suspend in the gaseous medium in the furnace. For example, the depth is 5.0 to 50 mm, and the opening has the same area as or a little larger than the bottom area of the aluminum component to be placed thereon. The quantity of the flux on the receptacle is 1.0 to 50 g per unit area (m²) of the aluminum component. If the quantity is less than 1.0 g, the brazeability is reduced because of the deficiency of the flux. However, if it exceeds 50 g/m² the over-fluxing is likely to spoil the appearance of the aluminum components. The preferred range is 10 to 25 g/m².

Figure 1:
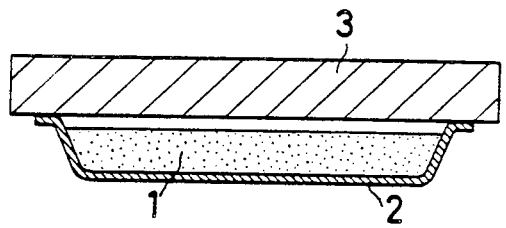
FIG. 1 is a cross-sectional view schematically showing one aspect of the present invention, where a receptacle holding a flux and an aluminum component placed thereon in a furnace.

After a flux 1 is placed in a receptacle 2, the receptacle 2 and an aluminum component 3 are set together in a furnace. FIG. 1 shows a state where the aluminum component 3 is placed directly on the receptacle 2, wherein care must be taken not to completely close the receptacle 2. If the receptacle 2 has a wider opening than the aluminum component, any suitable jig may be used to support the aluminum component 3 on the rims of the receptacle 2. Alternatively, the aluminum component can be suspended from a supporter above the receptacle 2. The relative positions of the flux and the receptacle are a matter of choice for those skilled in the art.

The furnace is filled with a nonoxidizing medium, such as inert gases. The furnace functions twofold; one is to suspend the flux in the nonoxidizing gaseous medium, and the other is to melt the braze metal so as to effect braze joints. When the furnace has a preheating division and a regular heating division, the receptacle and the aluminum component are first set together in the preheating division, and then they are shifted to the regular heating division. The preheating of the flux in the first division is of particular advantage when the flux is obtained from a residue which contains γ-AlF3 powder and/or β-AlF3 dissolved in a KF solution, in that the preheating in the first furnace dehydrates the residue. This omits the exothermic reaction process, thereby speeding up the brazing process. In this case it is necessary to add a larger quantity of flux than the required one in anticipation of the removal of the water content. If a flux suspension is placed in the receptacle, no difficulty arises in brazing because the water contained therein quickly vaporizes. Normally the receptacle and the aluminum components are set in the furnace at the same time, but either of them can be first set in the furnace.

The furnace is heated to a brazeable temperature, under which the suspension of the flux is facilitated to float in the nonoxidizing gaseous medium, thereby enabling the flux particles to deposit on the aluminum components. The brazeable temperature allows a braze metal to melt so as to effect the braze joints between the aluminum components. Preferably the braze metal has a melting point of 580° to 620° C., which is lower than that of the aluminum component and is higher than that of the flux. Al-base silicone alloys can be used for the braze metal, which contains Si of 4.5 to 13.5% by weight. A brazing sheet can be used, in which at least one of the aluminum component is clad. On particular cases where intricate joints are required, such as pipe-to-pipe joints, a solid flux is deliberately disposed on the parts to be brazed.

Next, the electrostatic flux depositing method will be described:

A flux is pulverized, and prepared in the powdery form. The aluminum components are earthed as an anode, and a spray gun is made a cathode, across which a negative high d.c. voltage such as 70 kv is applied. In this electrostatic field the flux particles are sprayed through a spray gun, thereby negatively charging the flux particles. The negatively charged flux particles are attracted to the positive aluminum components, and deposited thereon. Compressed air is used to eject the flux particles through the spray gun. The grain size of the flux particles is in the range of 6.0 to 75 μm, preferably 6.0 to 50 μm, on average per 50% by volume of the flux. If the particles are as fine as below the lower limit (6 μm), a choking is likely to occur in the pipes and the spray gun. If they are so large as to exceed the upper limit (75 μm), the flux particles are likely to rebound on the aluminum components instead of being adhered thereto. The preferred deposits are in a range of 1.0 to 15 g per unit area of the aluminum component. If the quantity exceeds the upper limit (15 g), the overfluxing negates the brazeability of the braze metal, and spoils the appearance of the aluminum components. More preferably, the range is 4.0 to 10 g.

The electrostatically fluxed aluminum components are heated in the furnace filled with a nonoxidizing gaseous medium so that the braze metal is melted to effect the braze joints between the aluminum components. When the braze metal is directly placed on the surfaces of aluminum components, it is preferably moistened with an organic solvent having a relatively low boiling point such as water or alcohol. It is desirable to dip the braze metal in the liquid.

Figure 2:
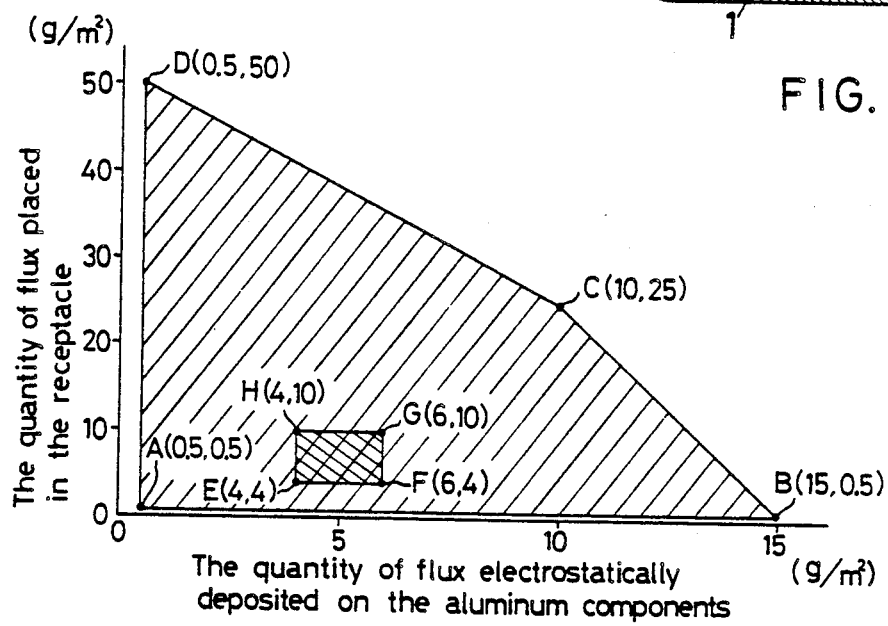
FIG. 2 is a graph showing another aspect of the present invention, indicating the relationship between the quantity of flux electrostatically deposited on the aluminum components and the quantity of flux placed in a receptacle.

The combined use of the flux suspending method and the electrostatic flux depositing method is also possible, where care must be taken not to add an excessive amount of flux. To avoid it, the flux should be placed in the receptacle by reference to the amount already deposited on the aluminum components by the electrostatic depositing method. Hereinafter, the electrostatic deposits will be referred to as a first dose of flux, and the supplies of flux by the suspending method will be as a second dose. In FIG. 2 the hatching depicts an optimum range defined by the coordinates A, B, C, and D. If the ratio of the first dose to the second dose falls out of this range, a problem due to the inadequate dosage is likely to occur. A more preferable range is depicted by the cross hatching defined by the coordinates E, F, G and H. The double dosages of flux secures an adequate deposit of the flux on the aluminum components. The present invention will be better understood by the following examples:

EXAMPLE 1

Specimens Nos. 1 to 4

A solution was prepared in which 5.5 kg of KF (99.8% purity) was dissolved in 6.0 of water. Then 6.5 kg of γ-AlF3 (grain size on average of 10 μm) was gradually added in the solution and agitated to cause an exothermic reaction, thereby removing the water content from the mixture. The dehydrated residue was allowed to dry in the atmosphere at 200° C. for 900 minutes. The dried residue was pulverized to obtain fluoride-base flux powder having a grain size of 15 μm on average.

Figure 3:
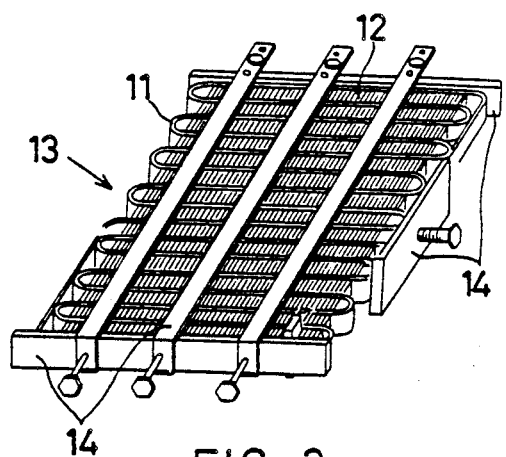
FIG. 3 is a perspective view schematically showing heat exchanger components provisionally assembled for brazing purpose.

As shown in FIG. 3, fin members 12 and tubes 11 of aluminum alloy (A1100) having a thickness of 0.8 mm were provisionally assembled as an assembly 13 for brazing purpose. The fin members 12 were made of a clad metal having a core of an aluminum alloy (A3003) and a layer of Al-base 10% silicone alloy, clad by 10% on each side in a brazing sheet (0.16 mm in thickness). The tubes 11 and the fins 12 were provisionally united by means of jigs 14.

The flux was placed in each of four tray-like receptacles of the same shape, having a depth of 25 mm. The amounts were 2 g, 10 g, 25 g and 50 g per unit area (m²) of each assembly 13. Each assembly 13 was placed on each receptacle. The receptacles and the assemblies were set together in a brazing furnace, and kept in a $N_2$ gaseous atmosphere maintained at 600° to 620° C. for three minutes, wherein the concentration of oxygen was 100 ppm or less.

Specimens Nos. 5 to 9

The dehydrated residue was prepared for the flux in the same manner as in the Example (1) but in this example it was used without pulverizing. The flux was placed in each of five receptacles of the same shape and size as in the Example (1). The quantities were 1 g, 2 g, 10 g, 25 g, and 50 g per unit area of the assemblies.

The same assemblies 13 as in the Example (1) were placed on the respective receptacles. The receptacles and the assemblies were set together in a drying furnace at 250° C. in the atmosphere for ten minutes. In this way the water content remaining in the residue was removed. Then the receptacles and the assemblies were shifted to a brazing furnace, and heated under the same condition as in the Example (1).

Specimens Nos. 10 to 14

The dehydrated residue was prepared for the flux in the same manner as in the Example (1) but in this example it was dried by heating at 200° C. in the atmosphere for 900 minutes. Without pulverizing, the flux was placed in each of five receptacles by 1 g, 5 g, 10 g, 20g, and 30 g per unit area of the assemblies. The receptacles and the assemblies were the same as those used in the Example (1). and set together in the brazing furnace in the same manner to effect the braze joint.

Specimen No. 15

This specimen was prepared by the known zincate method for comparison purpose. The same flux as in the Example (1) was suspended in water to obtain a 4 wt % suspension. The assembly 13 was dipped in the suspension to cover the whole surfaces thereof with the flux suspension. The fluxed assembly was then dried, and placed in a brazing furnace, in which it was kept in a $N_2$ gaseous atmosphere maintained at 600° to 620° C. for three minutes, wherein the concentration of oxygen was .100 ppm or less. In this way the braze joint was effected.

The specimens Nos. 1 to 15 were visually checked with respect to the conditions of the braze joints, the surfacial appearances, a possible adhesion between the heat exchanger and the jigs, and a possible discoloration were also observed. The results are shown in Table (1):

TABLE 1

| Spc. No. | Deposits of Flux (g/m²) | Braze Joints | Surface States | Jig v. HC | Discol. of jigs |
|---|---|---|---|---|---|
| 1 | 2 | good | clean | nil | nil |
| 2 | 10 | good | clean | nil | nil |
| 3 | 25 | good | clean | nil | nil |
| 4 | 50 | good | clean | nil | nil |
| 5 | 1 | good | clean | nil | nil |
| 6 | 2 | good | clean | nil | nil |
| 7 | 10 | good | clean | nil | nil |
| 8 | 25 | good | clean | nil | nil |
| 9 | 50 | good | clean | nil | nil |
| 10 | 1 | good | clean | nil | nil |
| 11 | 5 | good | clean | nil | nil |
| 12 | 10 | good | clean | nil | nil |
| 13 | 20 | good | clean | nil | nil |
| 14 | 30 | good | clean | nil | nil |

TABLE 1-continued

| Spc. No. | Deposits of Flux (g/m²) | Braze Joints | Surface States | Jig v. HC | Discol. of jigs |
|---|---|---|---|---|---|
| 15 | 20 | good | stain | adhered | noted |

(Note) Spc. stands for specimen Jig v. HC stand for a possible adhesion between the jigs and the provisionally assembled heat exchangers. Discol. of jigs stand for a possible discoloration of the jigs. The deposit of flux on the specimen (15) was measured after the preheating.

It will be appreciated from Table (1) that in the specimens Nos. 1 to 14 satisfactory braze joints result in spite of a relatively small quantity of flux. In addition, no stain was observed. Neither adhesion nor discoloration was observed.

EXAMPLE 2

Specimens Nos. 16 to 19

A solution was prepared in which 5.5 kg of KF (99.8% purity) was dissolved in 6.0 of water. Then 6.5 kg of γ-AlF₃ (at least 90% purity and grain size on average of 10 μm) was gradually added in the solution and agitated to cause an exothermic reaction, thereby removing the water content from the mixture. The dehydrated residue was allowed to dry in the atmosphere at 200° C. for 900 minutes. The dried residue was pulverized to obtain fluoride-base flux powder having a grain size of 15 μm on average. Four provisional assemblies of heat exchangers shown in FIG. 3 were used.

The flux powder was electrostatically deposited on the surfaces of each assembly by means of an electrostatic spray gun, wherein the assembly 13 was earthed as the anode, and the spray gun was made the cathode. A high d.c. voltage was applied between the assembly (anode) and the spray gun (cathode), and the flux powder was ejected through the gun by compressed air. The deposits of the flux powder were 1 g, 5 g, 10 g, and 15 g per unit area (m²) of each assembly.

Then the fluxed assemblies were individually kept in a $N_2$ gaseous atmosphere maintained at 600° to 620° C. for three minutes, wherein the concentration of oxygen was 100 ppm or less.

The specimens Nos. 16 to 19 were visually checked with respect to the conditions of the fluxing and the brazing, the surfacial appearances, a possible adhesion between the heat exchanger and the jigs, and a possible discoloration. The results are shown in Table (2):

TABLE (2)

| Spc. No. | Deposits of Flux (g/m²) | Covering of Flux | Braze Joints | Surface States | Jig v. HC | Discol. of jigs |
|---|---|---|---|---|---|---|
| 16 | 1 | evenly | good | clean | nil | nil |
| 17 | 5 | evenly | good | clean | nil | nil |
| 18 | 10 | evenly | good | clean | nil | nil |
| 19 | 15 | approx. evenly | good | approx. clean | nil | nil |

It will be understood from Table (2) that in the specimens Nos. 16 to 19 the flux is evenly or approximately evenly deposited on the surfaces of the assemblies, which results in satisfactory braze joints. In addition, no stain was observed. Neither adhesion nor discoloration was observed.

EXAMPLE 3

A solution was prepared in which 5.5 kg of KF (99.8% purity) was dissolved in 6.0 of water. Then 6.5 kg of γ-AlF₃ (grain size on average of 10 μm) was gradually added in the solution and agitated to cause an exothermic reaction, thereby removing the water content from the mixture. The dehydrated residue was allowed to dry in the atmosphere at 200° C. for 900 minutes. The dried residue was pulverized to obtain fluoride-base flux powder having grain sizes differing with each 50 vol %. The assemblies 13 shown in FIG. 3 were used.

The flux was deposited on the top surface of each assembly by use of the same electrostatic spray gun as in the Example 2 under the following conditions:

| | |
|---|---|
| Distance to the assembly | 100 to 150 mm |
| The direction of the gun | downward |
| Applied voltage | −70 kv |
| Spraying time | 15 sec. |
| Returns of the gun | 3 times |
| Surface area for deposit | 4m² |
| Exhaust rate of the flux | 142 g/min |

The deposits of the flux on the surfaces of the assembly 13 was measured, on the basis of which the percentage of the deposit to the supply was calculated, the results of which are shown in Table (3):

The fluxed assemblies were individually kept in a $N_2$ gaseous atmosphere maintained at 600° to 620° C. for three minutes, wherein the concentration of oxygen was 100 ppm or less.

The brazeability of each joint was assessed, and any choking in the spray gun possibly caused by the flux powder was experimentally checked by ejecting it continuously through the spray gun at the same rate (142 g/min) for thirty minutes, the results of which are shown in Table (3):

TABLE 3

| Spc. No. | Grain size (μm) | Deposit (g) per gun | Deposit per m² | Deposit/supply (%) | Braze joints (%) | Choking |
|---|---|---|---|---|---|---|
| 20 | 5 | 25 | 8.3 | 70.4 | 95 or more | occurred |
| 21 | 7 | 26 | 6.5 | 73.2 | 99 or more | nil |
| 22 | 10 | 27 | 6.8 | 76.1 | 99 or more | nil |
| 23 | 30 | 28 | 7.0 | 78.9 | 100 | nil |
| 24 | 50 | 20 | 5.0 | 56.3 | 95 or more | nil |
| 25 | 70 | 15 | 3.8 | 42.3 | 80 to 90 | nil |
| 26 | 80 | 12 | 3.0 | 33.8 | 70 to 80 | nil |
| 27 | 100 | 8 | 2.0 | 22.5 | 60 to 70 | nil |

(Note) The specimens Nos. 20, 26 and 27 are prepared for comparison purpose.

It will be understood from Table (3) that so long as the grain sizes fall in the specific range the flux is efficiently deposited on the surfaces of the assemblies, which results in satisfactory braze joints. In addition, the fluxing work is smoothly carried out without having choking troubles.

EXAMPLE 4

A flux powder was prepared in the same manner as in the Example (2).

Figure 4:
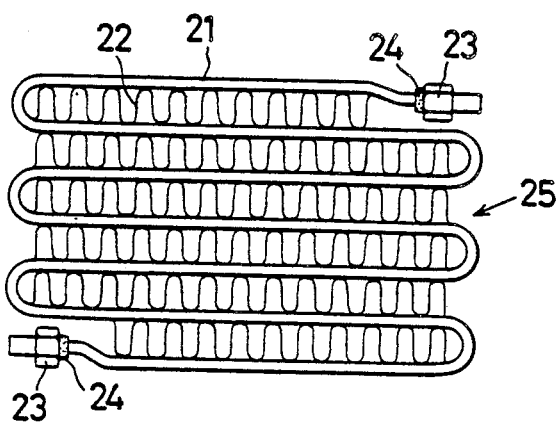
FIG. 4 is a front view schematically showing different type of heat exchanger components provisionally assembled for brazing purpose.

As shown in FIG. 4, a provisional assembly 25 of fin members 22 and tubes 21 of an extruded aluminum alloy (A1100) having a thickness of 0.8 mm was prepared. The fin members 22 were a clad metal having a core of an aluminum alloy (A3003) and a layer of Al-base 10% silicone alloy, clad by 10% on each side in a brazing sheet (0.16 mm in thickness). The heat exchanger had unions 23 for an inlet and an outlet at opposite ends of the tube 21. Four assemblies 25 were prepared. A braze metal 24 of Al-base 10 wt % silicone was placed near the unions 23 of each assembly, wherein the braze metals were used dry, wetted with water, alcohol and thinner.

The flux powder was electrostatically deposited on the surfaces of each assembly 25 by means of an electrostatic spray gun, wherein the assembly 25 was earthed as the anode, and the spray gun was made the cathode. A high d.c. voltage was applied between the assembly (anode) and the spray gun (cathode), and the flux powder was ejected through the gun by compressed air.

Then the fluxed assemblies were individually kept in a $N_2$ gaseous atmosphere maintained at 600° to 620° C. for three minutes, wherein the concentration of oxygen was 100 ppm or less. In this way the braze joint were effected.

The specimens Nos. 28 to 31 were visually checked with respect to the conditions of the fluxing and the brazing, the results of which are shown in Table (4):

TABLE 4

| Spc. No. | Wetting Liquid | Wet/Dry | Deposit of Flux | Braze joints (%) |
|---|---|---|---|---|
| 28 | none | dry | little | bad |
| 29 | water | wet | sufficient | excellent |
| 30 | alcohol | lightly wet | pretty suff. | good |
| 31 | thinner | lightly wet | pretty suff. | good |

(Note) The specimens No. 28 is for comparison purpose.

When the braze metal was used dry (Specimen No. 28), fillets were not fully formed in the joints between the unions 23 and the tubes 21. The braze joints were not satisfactory. In contrast, when the braze metals were wetted with water, alcohol or thinner, the braze joints were found satisfactory.

EXAMPLE 5

Specimens Nos. 32 to 52

A flux powder was prepared in the same manner as in the Example (2), and the assemblies of heat exchangers shown in FIG. 3 were used.

A first dose of flux was electrostatically given to each assembly 13 by means of an electrostatic spray gun. The deposits of the flux powder was 0.5 g, 1 g, 5 g, 10 g and 15 g per unit area (m²) of each assembly.

A second dose of flux was given by tray-like receptacles of the same shape each having a depth of 30 mm, the quantities of which are shown in Table (5). Each receptacle had a larger open area than the top surface area of each assembly. The assembly was placed on the receptacle, and kept in a $N_2$ gaseous atmosphere maintained at 600° to 620° C. for three minutes in the brazing furnace, wherein the concentration of oxygen was 100 ppm or less.

The specimens Nos. 32 to 52 were visually inspected with respect to the surfacial appearances, the brazeability of each joint, and any adhesion between the jigs and the heat exchangers was also checked, the results of which are shown in Table (5):

TABLE 5

| Spc. | 1st dose (g/m²) | 2nd dose (g/m²) | Surface Appearance | Braze Joints | Adhesion | Eval. |
|---|---|---|---|---|---|---|
| 32 | 0.5 | 5.0 | clean | good | nil | good |
| 33 | 0.5 | 50.0 | clean | good | nil | good |
| 34 | 1.0 | 0.5 | clean | good | nil | good |
| 35 | 1.0 | 1.0 | clean | good | nil | good |
| 36 | 1.0 | 5.0 | clean | good | nil | good |
| 37 | 1.0 | 10.0 | clean | good | nil | good |
| 38 | 1.0 | 25.0 | clean | good | nil | good |
| 39 | 1.0 | 45.0 | clean | good | nil | good |
| 40 | 5.0 | 0.5 | clean | good | nil | good |

TABLE 5-continued

| Spc. | 1st dose (g/m²) | 2nd dose (g/m²) | Surface Appearance | Braze Joints | Adhesion | Eval. |
|---|---|---|---|---|---|---|
| 41 | 5.0 | 1.0 | clean | good | nil | good |
| 42 | 5.0 | 5.0 | clean | good | nil | good |
| 43 | 5.0 | 10.0 | clean | good | nil | good |
| 44 | 5.0 | 25.0 | clean | good | nil | good |
| 45 | 5.0 | 35.0 | clean | good | nil | good |
| 46 | 10.0 | 0.5 | clean | good | nil | good |
| 47 | 10.0 | 1.0 | clean | good | nil | good |
| 48 | 10.0 | 5.0 | clean | good | nil | good |
| 49 | 10.0 | 10.0 | clean | good | nil | good |
| 50 | 10.0 | 25.0 | clean | good | nil | good |
| 51 | 15.0 | 0.5 | clean | good | nil | good |
| 52 | 15.0 | 1.0 | clean | good | nil | good |
| 53 | 20.0 | (after drying) | stained | good | found | not good |

It will be understood from Table (5) that the flux powder can be evenly deposited on the surface of the heat exchangers, which results in good braze joints so as to secure a permanent assembly. In addition, the surface appearance of the heat exchanger is satisfactory. No adhesion was observed between the jigs and the heat exchangers.

What is claimed is:

1. A method for brazing aluminum components, the method comprising: placing a flux and aluminum components in a furnace filled with a nonoxidizing gaseous medium, said flux being placed in an open receptacle and being separated from said aluminum components; suspending the flux in the nonoxidizing gaseous medium to allow it to contact the aluminum components; heating the aluminum component to a brazeable temperature; and melting a braze metal to provide a braze joint between the aluminum components.

2. A method as defined in claim 1, wherein the aluminum components are placed on the receptacle without completely closing the receptacle.

3. A method as defined in claim 1, wherein the flux is in the form of particles having grain sizes ranging from 2.0 to 80 μm.

4. A method as defined in claim 1, wherein the quantity of the flux is in the range of 1.0 to 50 g/m² with respect to the surface area of the aluminum components.

5. A method as defined in claim 1, wherein the receptacle has a depth ranging from 5.0 to 50 mm.

6. A method of brazing aluminum components, the method comprising preparing a powdery flux; electrostatically depositing the flux on the aluminum components; placing the fluxed aluminum components in a brazing furnace filled with a nonoxidizing gaseous medium; heating them to a brazeable temperature; and allowing a braze metal to melt and effect the braze joints between the aluminum components.

7. A method as defined in claim 6, wherein the flux particles have grain sizes ranging from 6.0 to 75 μm on average per 50% by volume.

8. A method as defined in claim 6, wherein the quantity of the flux deposited on the aluminum components is in the range of 1.0 to 15 g per unit area thereof.

9. A method of brazing aluminum components, the method comprising preparing a powdery flux; placing a braze metal previously wetted on the aluminum components; electrostatically depositing the flux on the wet braze metal; and heating the aluminum components to a brazeable temperature in a nonoxidizing gaseous atmosphere, thereby melting the braze metal and effecting the braze joints between the aluminum components.

10. A method of brazing aluminum components, the method comprising filling a brazing furnace with a nonoxidizing gaseous medium; setting a flux in the furnace, thereby allowing the flux to suspend in the nonoxidizing gaseous medium; placing an electrostatically fluxed aluminum components in the furnace; and heating the aluminum components to a brazeable temperature, thereby allowing a braze metal to melt and effect the braze joints between the aluminum components.

11. A method as defined in claim 10, wherein the flux is placed in an open receptacle.

12. A method as defined in claim 11, wherein the flux is in the form of particles having grain sizes ranging from 2.0 to 80 μm.

13. A method as defined in claim 11, wherein the receptacle has a depth ranging from 5.0 to 50 mm.

14. A method as defined in claim 10, wherein the flux electrostatically deposited on the aluminum component has grain sizes ranging from 6.0 to 75 μm on average per 50% by volume.

15. A method as defined in claim 10, wherein the quantity of the first flux electrostatically deposited on the aluminum components is in the range of 0.5 to 15 g per unit area thereof, and wherein the quantity of the second flux placed in the receptacle is in the range of 0.5 to 50 g per unit area of the aluminum components, wherein the quantum ratios of the first and second fluxes are in a range defined by coordinates 0.5:0.5, 15:0.5, 10:25 and 0.5:50, respectively.

* * * * *